United States Patent
Dadam et al.

(10) Patent No.: US 10,961,884 B1
(45) Date of Patent: Mar. 30, 2021

(54) EXHAUST GAS HEAT RECOVERY DEVICE SYSTEM AND METHOD

(71) Applicant: Ford Global Technologies, LLC, Dearborn, MI (US)

(72) Inventors: Sumanth Reddy Dadam, Dearborn, MI (US); Robert Roy Jentz, Westland, MI (US); Sanyam Sharma, Dearborn, MI (US); Sitaram Rejeti, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/787,616

(22) Filed: Feb. 11, 2020

(51) Int. Cl.
| | | |
|---|---|---|
| *F01N 3/02* | (2006.01) | |
| *F01N 5/02* | (2006.01) | |
| *F01N 9/00* | (2006.01) | |
| *F01N 11/00* | (2006.01) | |
| *F01N 1/16* | (2006.01) | |

(52) U.S. Cl.
CPC ........... *F01N 3/0205* (2013.01); *F01N 1/165* (2013.01); *F01N 5/02* (2013.01); *F01N 9/00* (2013.01); *F01N 11/002* (2013.01); *F01N 2240/02* (2013.01); *F01N 2240/04* (2013.01); *F01N 2560/06* (2013.01); *F01N 2900/0422* (2013.01); *F01N 2900/06* (2013.01)

(58) Field of Classification Search
CPC ... F01N 1/165; F01N 5/02; F01N 9/00; F01N 11/002; F01N 3/0205; F01N 2240/02; F01N 2240/10; F01N 2510/02; F01N 2560/06; F01N 2560/14; F01N 2900/06; F01N 2900/08; F01N 2900/12; F01N 2900/1631; F01N 2900/0422
USPC .......................................................... 60/320
See application file for complete search history.

(56) References Cited

U.S. PATENT DOCUMENTS

| | | | |
|---|---|---|---|
| 4,258,677 A * | 3/1981 | Sanders .................. | F02N 19/10 123/142.5 R |
| 6,875,407 B1 | 4/2005 | Biel, Jr. et al. | |
| 8,646,261 B2 | 2/2014 | Meisner et al. | |
| 9,441,568 B2 | 9/2016 | Ossareh et al. | |
| 2013/0312390 A1* | 11/2013 | Porras ................. | F02D 41/1446 60/274 |
| 2013/0312717 A1* | 11/2013 | Martin ...................... | F01N 9/00 123/568.16 |
| 2016/0024924 A1* | 1/2016 | Anthony ................. | F02B 53/02 60/531 |
| 2018/0230886 A1* | 8/2018 | Ghoniem .............. | F01N 3/0821 |

* cited by examiner

*Primary Examiner* — Audrey K Bradley
*Assistant Examiner* — Dapinder Singh
(74) *Attorney, Agent, or Firm* — Geoffrey Brumbaugh McCoy Russell LLP

(57) ABSTRACT

Methods and systems are provided for operating a vehicle that includes an exhaust gas heat recovery device having an exhaust heat recovery device valve that may be selectively opened and closed. In one example, a method may include storing heat from exhaust gases in a phase changing material and releasing the stored heat to surroundings of an exhaust heat recovery device valve to reduce a possibility of the exhaust heat recovery device valve sticking.

20 Claims, 5 Drawing Sheets

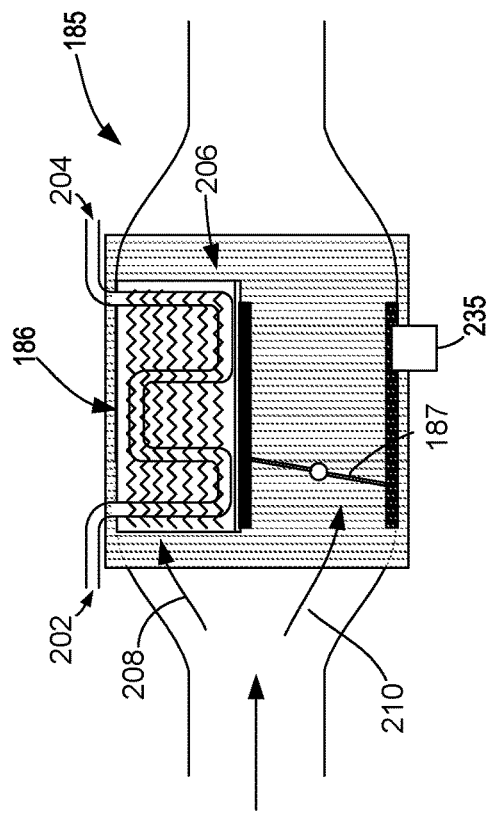
FIG. 2A
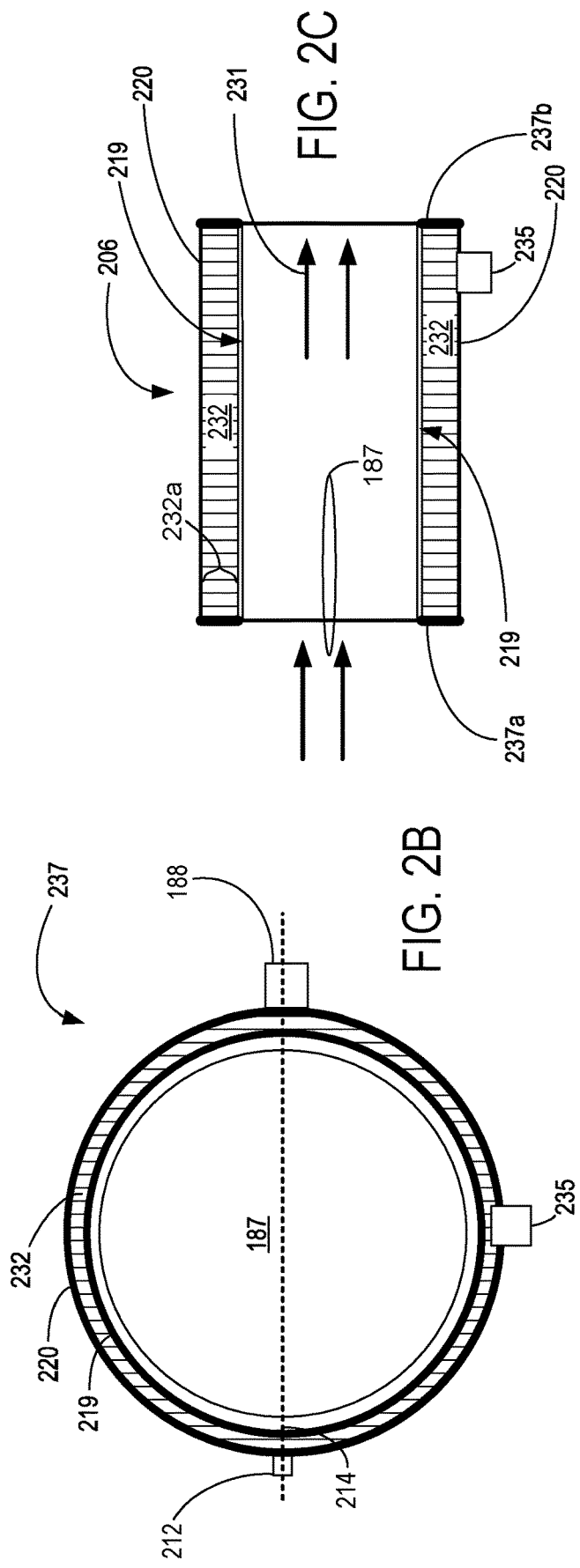
FIG. 2C
FIG. 2B

EXHAUST GAS HEAT RECOVERY DEVICE SYSTEM AND METHOD

FIELD

The present description relates generally to methods and systems for an exhaust gas heat recovery device that includes a phase change material (PCM) heat exchanger to reduce a possibility of adjustable exhaust valves from sticking due to ice formation.

BACKGROUND/SUMMARY

During conditions when a vehicle is not needed for a period of time, an engine of the vehicle may be stopped to conserve fuel. After the engine is stopped, it may be restarted so that the vehicle may transport people or goods. Restarting the engine may cause engine emissions to increase. Therefore, it may be desirable to shorten an amount of time that the engine may output higher emissions levels. One way to reduce engine emissions after a restart may be to rapidly increase engine temperature after the engine is started. Increasing the engine's temperature soon after engine starting may reduce engine hydrocarbon emissions by reducing clearances within the engine. However, if an expected amount of engine power is not available shortly after engine warming, vehicle drivability may be degraded. Therefore, it may be desirable to provide a way of reducing engine heating time while maintaining vehicle drivability.

In one example, the issues described above may be addressed by a method for operating a cooling system, comprising: transferring heat from exhaust gases to a phase changing material included in an exhaust gas heat recovery device that includes an exhaust gas to liquid coolant heat exchanger and an exhaust valve, where the liquid coolant heat exchanger is in fluidic communication with an engine; and transferring heat stored in the phase changing material to a housing or sleeve in which the exhaust valve of the exhaust gas heat recovery device is positioned after stopping operation of the engine.

By heating an exhaust valve of an exhaust gas heat recovery device with a phase changing material, it may be possible to provide consistent engine heating and vehicle drivability. In particular, a possibility of exhaust heat recovery device valve sticking that is due to icing may be reduced so that engine heating and engine performance may be provided more reliably. The exhaust heat recovery device valve and its surrounding material within the exhaust gas heat recovery device may be heated via a phase changing material when an engine is stopped so that ice may not form near the valve. The exhaust heat recovery device valve heating may ensure that the exhaust valve operates as expected when the engine is restarted so that the engine may be heated via exhaust gas and so that a heat exchanger in the exhaust gas heat recovery device may be bypassed when the engine is warmed. In addition, an amount of heat that is supplied to the phase changing material when the engine is operated may be increased so that the phase changing material reaches a desired temperature before the engine may be stopped again.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A shows a detailed cross sectional view of an exhaust gas heat recovery device;

FIG. 2B shows an upstream-looking point of view from the downstream end of an exhaust valve positioned in the exhaust gas heat recovery device;

FIG. 2C shows a detailed cross-sectional view of an adjustable exhaust valve and exhaust passage;

DETAILED DESCRIPTION

Figure 1:
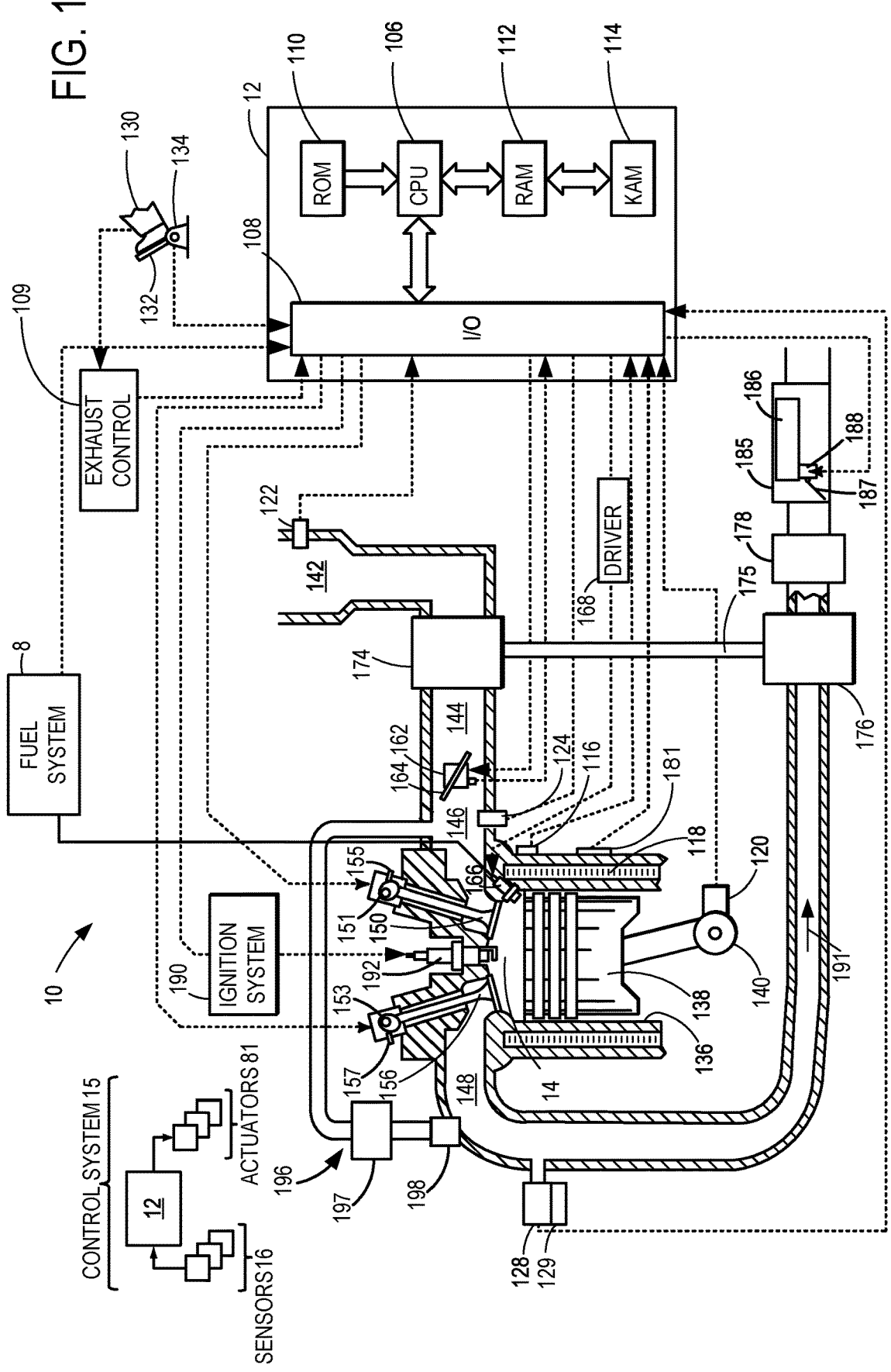
FIG. 1 shows an example internal combustion engine with an exhaust gas heat recovery device.
Figure 3:
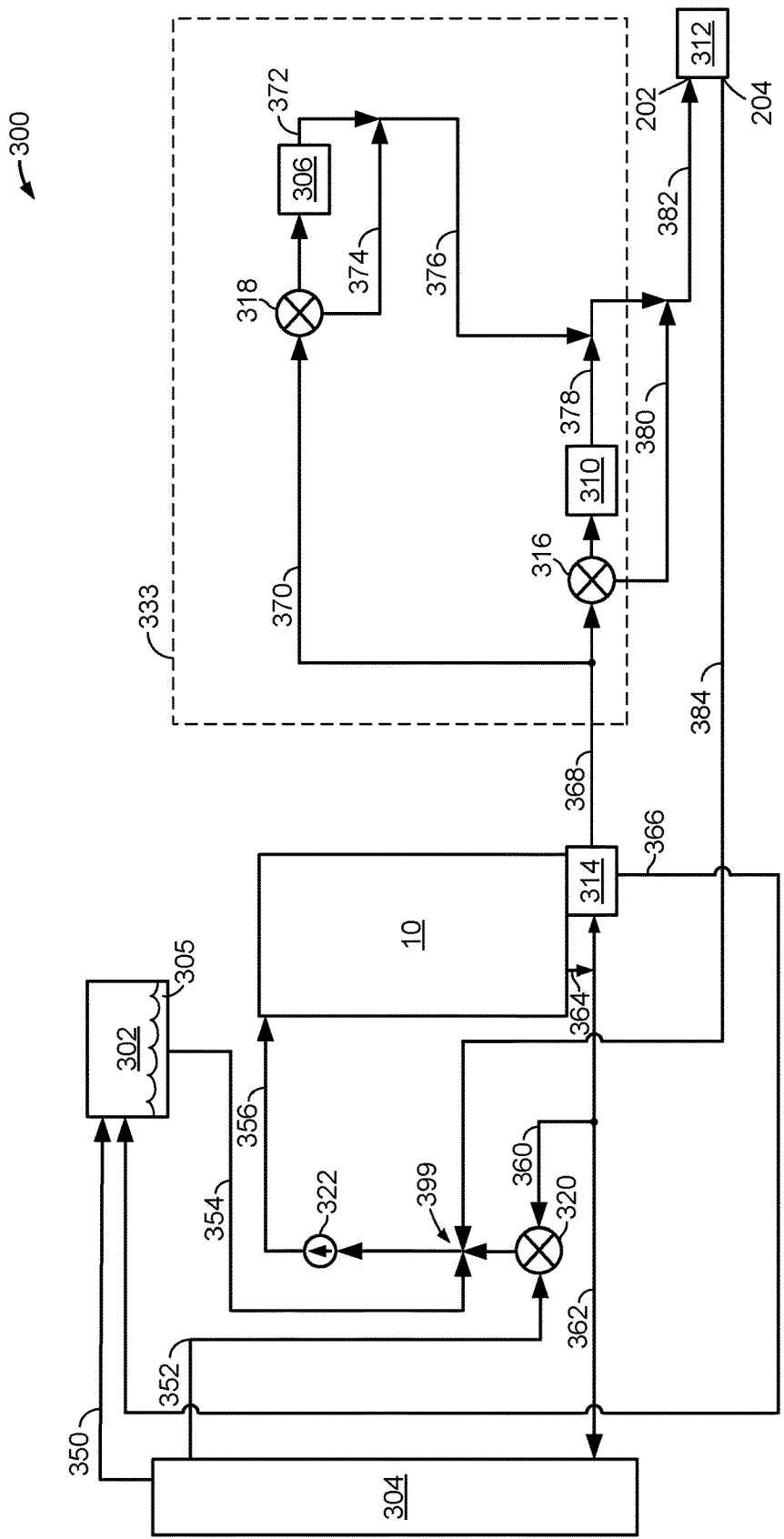
FIG. 3 shows a schematic of an engine cooling system.
Figure 4:
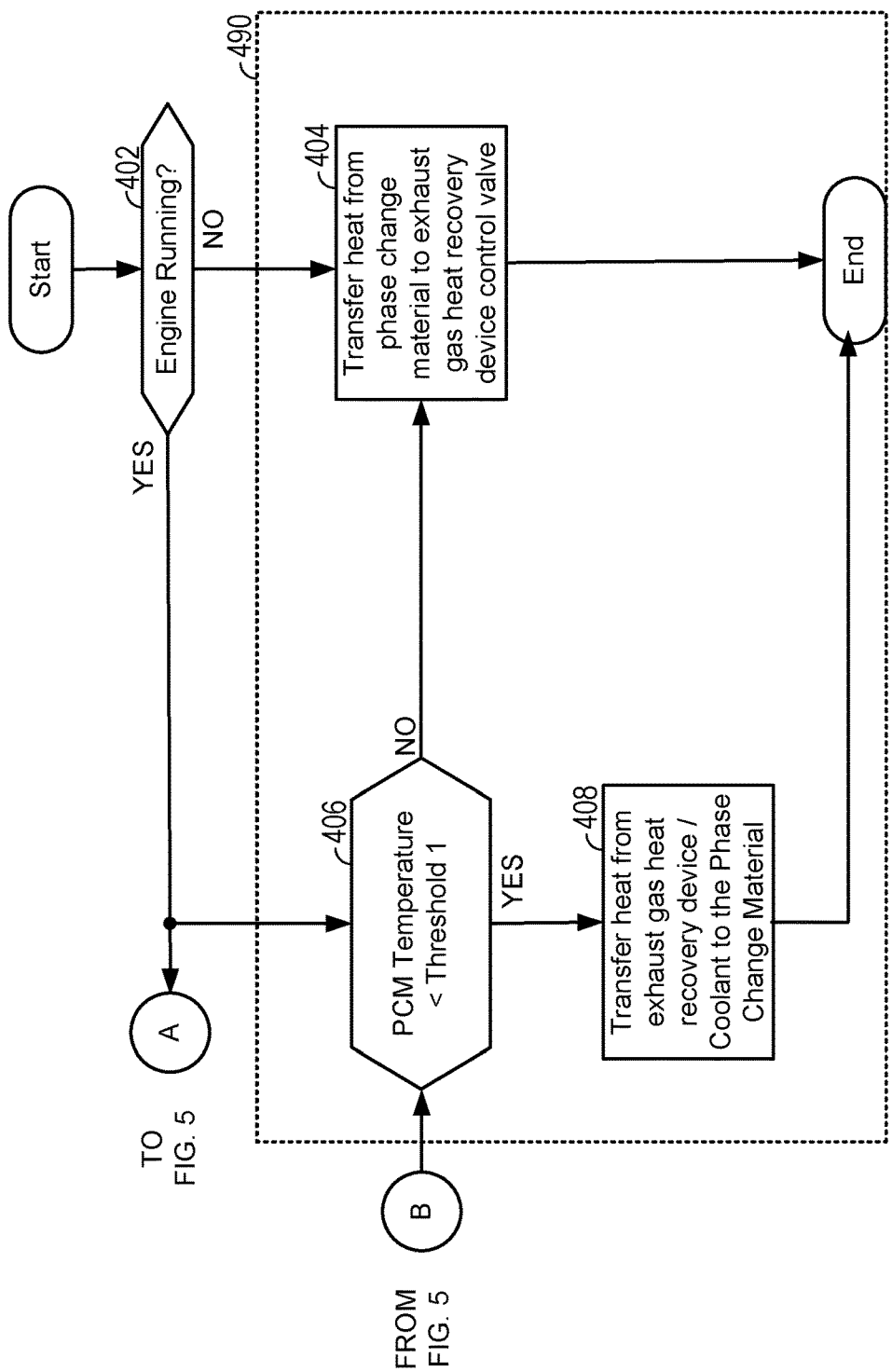
FIGS. 4 and 5 show a flowchart of an example method for operating an engine and cooling system.
Figure 5:
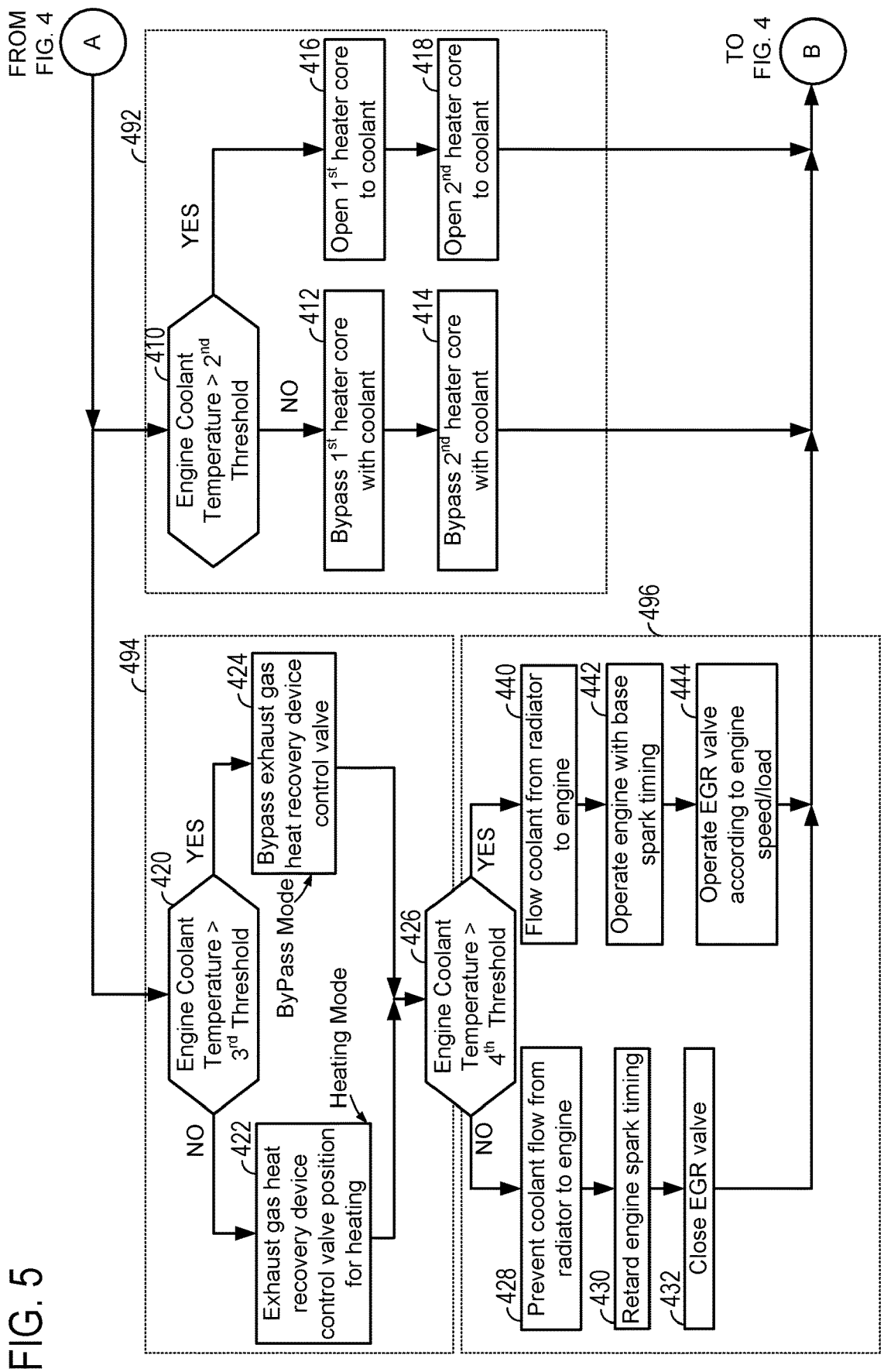

The following description relates to systems and methods for warming a valve of an exhaust gas heat recovery device. The valve may be warmed when ambient temperature is low so that the possibility of ice forming at the valve may be reduced. By reducing ice formation near the valve, it may be possible to ensure that engine heating and engine performance are maintained at desired levels. FIG. 1 shows an example engine that includes an exhaust gas heat recovery device. FIGS. 2A-2C show details of an exhaust gas heat recovery device. An example liquid coolant system that includes the exhaust gas heat recovery device is shown in FIG. 3. An example method for operating an engine and liquid coolant system is shown in FIGS. 4 and 5.

FIGS. 1 and 2A-2C may be discussed collectively to provide a clear description. FIG. 1 depicts an example embodiment of a combustion chamber or cylinder of internal combustion engine 10. Engine 10 may receive control parameters from a control system including controller 12 and input from a human vehicle operator 130 via an input device 132. In this example, input device 132 includes an accelerator pedal and a pedal position sensor 134 for generating a proportional pedal position signal. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10. Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 175 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust temperature sensor 129 off exhaust passage 148 upstream of emission control device 178. In an alternate embodiment, these sensors may not be located adjacent to one another and may be dispersed through exhaust passage 148. Exhaust gas sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof. Exhaust gas sensor 128, exhaust temperature sensor 129 and exhaust constituent sensor 127 provide input to controller 12 via input/output ports 108.

Emissions control device 178 may be a three way catalyst, particulate filter, oxidation catalyst, or combination of the same. Emissions control device 178 is positioned downstream of turbine and upstream of exhaust gas heat recovery device 185 according to a direction of exhaust flow as indicated by arrow 191. Exhaust gas heat recovery (EGHR) device 185 includes an EGHR valve 187, which may be referred to as EGHR valve. EGHR device 185 also includes an exhaust gas to liquid coolant heat exchanger 186 and an EGHR valve actuator 188. A more detailed view of EGHR device 185 is shown in FIGS. 2A-2C.

Exhaust temperature may be measured by one or more temperature sensors such as exhaust temperature sensor 129 located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize some form of variable valve timing (VVT) such as one or more of cam profile switching (CPS), variable cam timing (VCT), such as twin independent variable cam timing (tiVCT), and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems.

In some embodiments, each cylinder of engine 10 may include a spark plug 192 for initiating combustion. Ignition system 190 can provide an ignition spark to combustion chamber 14 via spark plug 192 in response to a spark advance signal from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing fuel. As a non-limiting example, cylinder 14 is shown including one fuel injector 166. Fuel injector 166 is shown coupled directly to cylinder 14 for injecting fuel directly therein in proportion to the pulse width of a signal received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector 170 (not shown) providing fuel into the intake port upstream of cylinder 14.

Fuel may be delivered by the injector to the cylinder during a single cycle of the cylinder. Furthermore, for a single combustion event, multiple injections of the delivered fuel may be performed per cycle. The multiple injections may be performed during the compression stroke, intake stroke, or any appropriate combination thereof.

Exhaust gas may be recirculated from exhaust manifold 148 to intake passage 146 via exhaust gas recirculation (EGR) passage 196. EGR valve 198 may be selectively opened and closed to direct exhaust gases from exhaust manifold 148 to intake passage 146. EGR may be cooled via EGR cooler 197.

As described above, FIG. 1 shows one cylinder of a multi-cylinder engine. As such each cylinder may similarly include its own set of intake/exhaust valves, fuel injector(s), spark plug, etc.

Controller 12 is shown in FIG. 1 as a microcomputer, including microprocessor unit 106, input/output ports 108, an electronic storage medium for executable programs and calibration values shown as read only memory 110 in this particular example, random access memory 112, keep alive memory 114, and a data bus. Controller 12 may receive various signals from sensors coupled to engine 10, in addition to those signals previously discussed, including measurement of inducted mass air flow from mass air flow sensor 122; engine coolant temperature from temperature sensor 116 coupled to cooling sleeve 118; a profile ignition pickup signal from Hall effect sensor 120 (or other type)

coupled to crankshaft 140; throttle position from a throttle position sensor; manifold absolute pressure signal from sensor 124; and knock signal from knock sensor 181. Knock sensor 181 may alternatively be located on the cylinder head or may be a sensor to detect vibrations from knock in crankshaft 140. Engine speed signal, RPM, may be generated by controller 12 from sensor 120. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by microprocessor unit 106 for performing the methods described below as well as other variants that are anticipated but not specifically listed. Engine 10 may be controlled at least partially by a control system 15 including controller 12. Controller 12 may receive various signals from sensors 16 coupled to engine 10, and send control signals to various actuators 81 coupled to the engine and/or vehicle. The various sensors may include, for example, various temperature, pressure, and air-fuel ratio sensors. The various actuators may include, for example, valves, throttles, and fuel injectors.

As mentioned above, sensors 16 may include any temperature, pressure, positioning, humidity or contacting sensors or any other sensors described herein. In an example, sensors 16 may include one or more microphones. Actuators 81 may include actuators used to control the EGHR valve 187. Controller 12 may be a microcomputer, including a microprocessor unit, input/output ports, an electronic storage medium for executable programs and calibration values. Controller 12 may be programmed with computer readable data representing instructions executable to perform the methods described below as well as other variants that are anticipated but not specifically listed.

FIG. 2A shows a detailed cross sectional view of EGHR device 185. EGHR device 185 includes an exhaust gas to liquid coolant (e.g., glycol) heat exchanger 186. The exhaust gas to liquid coolant heat exchanger 186 includes a coolant inlet 202 and a coolant outlet 204. Liquid coolant heat exchanger 186 may be configured in a tube and fin arrangement. EGHR device 185 also includes an EGHR valve 187 (e.g., alternatively referred to as an exhaust valve) that may be selectively opened and closed via controller 12. EGHR valve 187 is shown in a closed position. EGHR device 185 includes phase changing material (PCM) heat exchanger 206.

Exhaust gas may flow from the engine and through an exhaust pipe. Heat may be transferred from exhaust gas to liquid coolant via heat exchanger 186 and through PCM heat exchanger 206 when EGHR valve 187 is controlled in heating mode (e.g., fully closed) as indicated by arrow 208. Exhaust gas may flow from the engine through the exhaust pipe and through PCM heat exchanger 206 when EGHR valve 187 is controlled to bypass position (e.g., fully open) as indicated by arrow 210. A temperature of PCM material in PCM heat exchanger 206 may be determined via information sent from temperature sensor 235 to controller 12.

Exhaust gas to liquid coolant heat exchanger 186 is in thermal communication with PCM heat exchanger 206 so that heat energy may be transferred back and forth between exhaust gas to liquid coolant heat exchanger 186 and PCM heat exchanger 206.

FIG. 2B shows a cross-section 237 of PCM heat exchanger 206. The cross-section 237 shows an upstream-looking point of view from the downstream end of EGHR device 185. The EGHR valve 187 may comprise a butterfly, damper, quarter turn, or compression valve as indicated 187. In some examples, the positioning of adjustable EGHR valve 187 may be adjusted by adjustable EGHR valve actuator 188. EGHR valve actuator 188 may adjust the position or rotation angle of EGHR valve 187 along a valve rotational axis 214, wherein the rotational axis includes a rotational rod in order to provide turning of the EGHR valve 187 via EGHR valve actuator 188. In an example, the rotational rod of valve rotational axis 214 may be attached to and passing through EGHR valve 187 or it may be built into EGH valve 187 as a single body. A position of EGHR valve 187 may be relayed to controller 12 from position sensor 212.

In an example, PCM heat exchanger 206 may comprise an inner sleeve 219 and an outer sleeve 220. Inner sleeve 219 and outer sleeve 220 may cover heat exchanger PCM 232. In an example, the heat exchanger PCM 232 may comprise any appropriate phase change material and the inner sleeve 219 and outer sleeve 220 may be referred to as a housing that holds the PCM. In an example, the heat exchanger material 232 may comprise any or any combination of a wax (for example, paraffin wax), salt hydrates, or any other phase change material. In an example the heat exchanger PCM 232 may comprise any combination of Zn, Mg, Al, and Si. In an example the heat exchanger PCM 232 may comprise a lithium nitrate material. In an example, the heat exchanger PCM 232 may be configured to absorb thermal energy and store thermal energy during a phase transition. In an example, the heat exchanger PCM 232 may absorb thermal energy and store thermal energy during a solid to liquid phase transition. In an example, the heat exchanger PCM 232 may absorb thermal energy and store thermal energy during a liquid to solid phase transition.

In an example, the temperature sensor 235 may be installed within the outer sleeve 220 so that it may be in physical contact with PCM 232. In an example, the inner and outer sleeves 219 and 220 may be formed from any desirable metal such as aluminum or steel or any desirable alloy. In an example, the sensors and actuators 212, 222, and 235 may be included within sensors 16 of the control system.

FIG. 2C shows a cross-sectional view of PCM heat exchanger 206. In an example, PCM heat exchanger 206 may include one or more phase change material temperature sensors 235. The PCM temperature sensor 235 may be in physical contact with PCM 232. In an example, the heat exchanger material 232 may have a heat exchanger material thickness 232a which may be adjusted to provide more or less heat capacity, wherein a thicker heat exchanger material thickness 232a would provide additional heat capacity and a less thick heat exchanger material thickness 232a would provide less heat capacity.

In an example, inner and outer heat exchanger sleeves 219 and 220 may be sealed at both ends by an upstream seal 237a and a downstream seal 237b ends. Arrows 231 show a direction of exhaust gas flow through PCM heat exchanger 206. EGHR valve 187 is shown in an open position.

Turning now to FIG. 3, a schematic of a cooling system is shown. Cooling system 300 may selectively cool or heat engine 10. Arrows or line segments shown between devices (e.g., 370) represent conduits or ducts for liquid coolant. Direction of flow through the conduits or ducts is indicated by the direction of the arrow heads.

Coolant system includes a liquid coolant pump 322 that may be driven via engine 10 or via an electric motor (not shown). Liquid coolant pump 322 supplies coolant to engine 10 via conduit or passage 356. Liquid coolant 305 may warm or cool engine 10. Liquid coolant 305 may flow from engine 10 via conduit 364 and conduit 362 to radiator 304. Alternatively, or in addition, liquid coolant 305 may flow from engine 10 via conduit 364 to exhaust gas recirculation (EGR) cooler 314. Liquid coolant 305 may flow from EGR cooler 314 to degas bottle 302 via conduit 366. Alternatively, liquid coolant 305 may flow from EGR cooler 314 to first heater core bypass valve 316 and second heater core bypass valve 318 via conduits 368 and 370.

First heater core 310 may selectively heat air in a front portion of passenger cabin 333. First heater core bypass valve 316 may allow liquid coolant to bypass (e.g., not flow through) first heater core 310 via bypass conduit or passage 380 when first heater core bypass valve 316 is in a first position. First heater core bypass valve 316 may allow liquid coolant to flow through first heater core 310 via conduit or passage 378 when first heater core bypass valve 316 is in a second position. Liquid coolant may flow from first heater core bypass valve 316 to EGHR device 312 via conduit or passage 376.

Second heater core 306 may selectively heat air in a rear portion of passenger cabin 333. Second heater core bypass valve 318 may allow liquid coolant to bypass (e.g., not flow through) second heater core 306 via bypass conduit or passage 374 when second heater core bypass valve 318 is in a first position. Second heater core bypass valve 318 may allow liquid coolant to flow through second heater core 306 via conduit or passage 372 when second heater core bypass valve 318 is in a second position. Liquid coolant may flow from second heater core bypass valve 318 to EGHR device 312 via conduit or passage 382.

Liquid coolant 305 may flow into EGHR device via inlet 202. Liquid coolant 305 may flow out of EGHR device via outlet 204. Liquid coolant 305 may flow from EGHR device 312 to pump 322 via conduit or passage 384 and junction 399. Liquid coolant 305 may flow from degas bottle 302 to junction 399 and pump 322. Liquid coolant 305 may flow from radiator 304 to degas bottle via conduit or passage 350. Liquid coolant 305 may also flow from radiator 304 to valve 320 via conduit or passage 352. In one example, valve 320 may be an electrically controlled thermostat having a position that is adjusted via controller 12 in response to a temperature of engine 10. Liquid coolant 305 may also flow from engine 10 to valve 320 via conduit or passage 360.

Engine cooling: As the engine reaches a predetermined operating temperature (e.g., >85° C.), valve 320 may begin to open so that liquid coolant 305 may flow from radiator 304 to engine 10 to cool engine. Radiator 304 may cool liquid engine coolant 305 when air passes through radiator 304. Warm coolant may flow to first heater core 310 and second heater core 306 when cabin heating is requested via vehicle occupants.

Engine heating: At lower engine temperatures, valve 320 may be closed so that liquid coolant 305 does not flow from radiator 304 to engine 10. However, liquid coolant 305 may flow from EGHR 312 to pump 322 and engine 10 to heat engine 10. In particular, heat from engine exhaust may warm liquid coolant 305 via EGHR 312 and heat contained in liquid coolant 305 may then be transferred to engine 10 to reduce engine warm-up time and engine emissions.

Heating of PCM: when a temperature of PCM 232 is less than a threshold, heat may be transferred from both engine exhaust gases and liquid coolant 305 to PCM 232. A temperature of liquid coolant 305 may remain at a higher level when valves 316 and 318 are positioned such that liquid coolant 305 bypasses first heater core 310 and second heater core 306 before it enters EGHR device 312. Thus, an amount of time that it takes to increase a temperature of PCM 232 to a threshold temperature may be decreased via adjusting bypass valves 318 and 316 so that liquid coolant bypasses first heater core 310 and second heater core 306.

Thus, the system of FIGS. 1-3 provides fora system for recovering heat from exhaust gases of an engine, comprising: an inner heat exchanger sleeve and an external heat exchanging sleeve covering at least a portion of phase changing material; an exhaust gas to liquid coolant heat exchanger in fluidic communication with an engine; and a valve directing exhaust gas from the engine to the inner heat exchanger sleeve when the valve is open, the valve directing exhaust gas from the engine to the exhaust gas to liquid coolant heat exchanger when the valve is closed. The system further comprises a heater core bypass valve. The system further comprises a valve that selectively prevents coolant flow from a radiator to an engine via a junction. The system further comprises a controller including executable instructions stored in non-transitory memory to open the heater core bypass valve in response to a temperature of the phase changing material. The system further comprises additional executable instructions to close the valve that selectively prevents coolant flow from the radiator to the engine via the junction in response to the temperature of the phase changing material. The system further comprises retarding engine spark timing in response to the temperature of the phase changing material.

Referring now to FIGS. 4 and 5, a flowchart of a method for operating an engine is shown. At least portions of method 400 may be implemented as executable controller instructions stored in non-transitory memory. Method 400 may operate in cooperation with the system of FIGS. 1-3. Additionally, portions of method 400 may be actions taken in the physical world to transform an operating state of an actuator or device. The method of FIG. 4 may be incorporated into the system of FIGS. 1-3 as executable instructions stored in non-transitory memory.

FIG. 4 is broken into separate sections. PCM temperature control is provided in section 490. Passenger cabin heating control is performed in section 492. EGHR valve control is provided in section 494. Finally, engine thermostat control is provided in section 496.

At 402, method 400 judges if the engine is stopped or not operating. Method 400 may judge that the engine is stopped when engine position is not changing (e.g., the engine is not rotating). If method 400 judges that the engine is stopped, the answer is yes and method 400 proceeds to 406, 410, and 420. Otherwise, the answer is no and method 400 proceeds to 404.

At 406, method 400 judges if a temperature of the PCM is less than first threshold. If so, the answer is yes and method 400 proceeds to 408. Otherwise, the answer is no and method 400 proceeds to 404. The PCM temperature may be determined via sensor 235.

At 404, the PCM 232 may change from a liquid state to a solid state as heat energy is transferred from PCM 232 to inner sleeve 219 and EGHR device 185. By transferring heat from PCM 232 to inner sleeve 219 and EGHR device 185, it may be possible to reduce a possibility of ice forming within EGHR device 185 so that EGHR valve 187 may operate freely. Method 400 proceeds to exit.

At 408, heat may be transferred from EGHR device 185 (e.g., heat) to PCM 232 via an inner sleeve 219 through exhaust gas or the liquid engine coolant. The PCM 232 may change from a solid state to a liquid state. Method 400 proceeds to exit.

At 410, method 400 judges if an engine temperature (e.g., engine coolant or cylinder head temperature) is greater than a second threshold temperature (e.g., 30° C., or alternatively, an cabin heat request temperature such as 20° C.). If so, the answer is yes and method 400 proceeds to 416. Otherwise, the answer is no and method 400 proceeds to 412.

At 412, method 400 bypasses liquid coolant flow around a first heater core (e.g., 310 of FIG. 3) so that a greater amount of heat may be transferred from the engine to the PCM 232 via engine coolant. Heat may be transferred from the coolant in the exhaust gas to liquid coolant heat exchanger 186 to the PCM heat exchanger 206 and PCM 232 since the exhaust gas to liquid coolant heat exchanger 186 is in thermal communication with PCM heat exchanger 206 via outer sleeve 220. First heater core bypass valve 316 may be fully opened via controller 12 so that liquid coolant bypasses first heater core 310. Method 400 proceeds to 414.

At 414, method 400 bypasses liquid coolant flow around a second heater core (e.g., 306 of FIG. 3) so that a greater amount of heat may be transferred from the engine to the PCM 232 via engine coolant. Second heater core bypass valve 318 may be fully opened via controller 12 so that liquid coolant bypasses second heater core 306. Method 400 returns to 406.

At 416, method 400 directs liquid coolant flow through the first heater core (e.g., 310 of FIG. 3) so that a passenger cabin may be heated. First heater core bypass valve 316 may be fully closed via controller 12 so that liquid coolant flows through first heater core 310. Method 400 proceeds to 418.

At 418, method 400 directs liquid coolant flow through the second heater core (e.g., 306 of FIG. 3) so that the passenger cabin may be heated. Second heater core bypass valve 318 may be fully closed via controller 12 so that liquid coolant flow through second heater core 306. Method 400 returns to 406.

At 420, method 400 judges if an engine temperature (e.g., engine coolant or cylinder head temperature) is greater than a third threshold temperature (e.g., 40° C., or alternatively, an engine warm operating temperature such as 100° C.). If so, the answer is yes and method 400 proceeds to 424. Otherwise, the answer is no and method 400 proceeds to 422.

At 422, method 400 fully closes the EGHR valve 187 to enter heating mode and begins to transfer heat energy from engine exhaust to liquid coolant via heat exchanger 186. The heat in the engine coolant is then transferred to the engine. Valve or thermostat 320 may be closed to prevent coolant flow from radiator 304 to engine 10 while EGHR valve 187 is either open or closed. In addition, pump 322 may be activated to circulate coolant between engine 10 and EGHR device 185. Method 400 proceeds to 426.

At 424, method 400 fully opens EGHR valve 187 to enter bypass mode so that exhaust gas flows around the heat exchanger 186 through the straight pipe and through EGHR valve 187. Heat in exhaust gases may heat PCM 232 when EGHR valve 187 is fully open. Method 400 proceeds to 426.

At 426, method 400 judges if the engine coolant temperature or cylinder head temperature is greater than a fourth threshold temperature (e.g., 100° C.). If so, the answer is yes and method 400 proceeds to 440. Otherwise, the answer is no and method 400 proceeds to 428.

At 428, method 400 optionally prevents liquid coolant from flowing from the radiator to the engine. In one example, method 400 prevents liquid coolant from flowing from the radiator to the engine via closing valve 320. Method 400 proceeds to 430.

At 430, method 400 retards spark timing from a base spark timing that is based on the engine's present speed and load. By retarding spark timing, temperatures of liquid coolant flowing through the engine and engine exhaust gases may be increased to warm the PCM 232 sooner. It may be particularly beneficial to retard engine spark timing if engine operating time is expected to be short and when the PCM temperature is low. Method 400 proceeds to 432.

At 432, method 400 closes (e.g., fully or partially) the EGR valve so that EGR is not cooled via liquid coolant. This may allow additional heat energy to be extracted via the EGHR device so that the PCM may be raised to a threshold temperature sooner than if the EGR valve were to remain open. Method 400 returns to 406.

At 440, method 400 optionally directs liquid coolant to flow from the radiator to the engine. In one example, method 400 directs liquid coolant from the radiator to the engine via opening valve 320. Method 400 proceeds to 442.

At 442, method 400 operates the engine with base spark timing. The base spark timing may be a function of engine speed and load. The base spark timing may be empirically determined via operating the engine on a dynamometer and adjusting spark timing as a function of engine speed and load until a desired engine torque is generated. Method 400 proceeds to 444.

At 444, method 400 operates the EGR valve in response to engine speed and load. In one example, the EGR valve position is adjusted as a function of engine speed and load so that a desired percentage of EGR is inducted into the engine. By inducting EGR into the engine, engine emissions may be reduced and engine fuel economy may be increased. Method 400 returns to 406.

Thus, heating of PCM may be optimized via adjusting valves in a cooling system. Further, heat stored in the PCM may be used to reduce engine emissions and warm up time.

The method of FIG. 4 provides for a method for operating a cooling system, comprising: transferring heat from exhaust gases to a phase changing material included in an exhaust gas heat recovery device that includes an exhaust gas to liquid coolant heat exchanger and an exhaust valve, where the liquid coolant heat exchanger is in fluidic communication with an engine; and transferring heat stored in the phase changing material to a housing or sleeve in which the exhaust valve of the exhaust gas heat recovery device is positioned after stopping operation of the engine. The method includes where the phase changing material changes from a solid state to a liquid state when heat is transferred from the exhaust gases to the phase changing material. The method includes where the phase changing material changes from a liquid state to a solid state when heat is transferred from the phase changing material to the exhaust valve. The method further comprises closing the exhaust valve to direct exhaust gas flow from the engine to the liquid coolant heat exchanger in response to a temperature of the engine being less than a threshold temperature.

In some examples, the method further comprises opening the exhaust valve to direct exhaust gas flow away from the engine to the liquid coolant heat exchanger in response to the temperature of the engine being greater than the threshold temperature. The method further comprises retarding spark timing of the engine from base spark timing when transferring heat from exhaust gases to the phase changing material. The method further comprises holding an exhaust gas recirculation valve closed when transferring heat from exhaust gases to the phase changing material. The method further comprises transferring heat from liquid coolant that flows through the liquid coolant heat exchanger to the engine.

Method 400 also provides for a method for operating a cooling system, comprising: opening a heater core bypass valve and transferring heat from exhaust gases to a phase changing material included in an exhaust gas heat recovery device that includes an exhaust gas to liquid coolant heat exchanger and an exhaust valve in response to a temperature of the phase changing material, where the liquid coolant heat exchanger is in fluidic communication with an engine; and transferring heat stored in the phase changing material to a housing or sleeve in which the exhaust valve of the exhaust gas heat recovery device is positioned after stopping operation of the engine. The method further comprises closing a valve to prevent coolant flow from a radiator to the engine in response to the temperature of the phase changing material. The method further comprises retarding spark timing of the engine in response to the temperature of the phase changing material. The method further comprises holding an exhaust gas recirculation valve closed in response to the temperature of the phase changing material. The method further comprises opening the valve to allow coolant flow from the radiator to the engine in response to the temperature of the phase changing material exceeding a threshold temperature. The method further comprises opening the exhaust valve in response to a temperature of the engine exceeding a threshold temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a cooling system, comprising:
   transferring heat from exhaust gases to a phase changing material included in an exhaust gas heat recovery device that includes an exhaust gas to liquid coolant heat exchanger and an exhaust heat recovery device valve, where the liquid coolant heat exchanger is in fluidic communication with an engine; and
   transferring heat stored in the phase changing material to a housing or sleeve in which the exhaust heat recovery device valve of the exhaust gas heat recovery device is positioned after stopping operation of the engine.

2. The method of claim 1, where the phase changing material changes from a solid state to a liquid state when heat is transferred from the exhaust gases to the phase changing material.

3. The method of claim 1, where the phase changing material changes from a liquid state to a solid state when heat is transferred from the phase changing material to the exhaust heat recovery device valve.

4. The method of claim 1, further comprising closing the exhaust heat recovery device valve to direct exhaust gas flow from the engine to the liquid coolant heat exchanger in response to a temperature of the engine being less than a threshold temperature.

5. The method of claim 4, further comprising opening the exhaust heat recovery device valve to direct exhaust gas flow away from the engine to the liquid coolant heat exchanger in response to the temperature of the engine being greater than the threshold temperature.

6. The method of claim 1, further comprising retarding spark timing of the engine from base spark timing when transferring heat from exhaust gases to the phase changing material.

7. The method of claim 1, further comprising holding an exhaust gas recirculation valve closed when transferring heat from exhaust gases to the phase changing material.

8. The method of claim 1, further comprising transferring heat from liquid coolant that flows through the liquid coolant heat exchanger to the engine.

9. A system for recovering heat from exhaust gases of an engine, comprising:
   an inner heat exchanger sleeve and an external heat exchanging sleeve covering at least a portion of phase changing material;
   an exhaust gas to liquid coolant heat exchanger in fluidic communication with an engine; and
   a valve directing exhaust gas from the engine to the inner heat exchanger sleeve when the valve is open, the valve directing exhaust gas from the engine to the exhaust gas to liquid coolant heat exchanger when the valve is closed.

10. The system of claim 9, further comprising a heater core bypass valve.

11. The system of claim 10, further comprising a valve that selectively prevents coolant flow from a radiator to an engine via a junction.

12. The system of claim 11, further comprising a controller including executable instructions stored in non-transitory memory to open the heater core bypass valve in response to a temperature of the phase changing material.

13. The system of claim 12, further comprising additional executable instructions to close the valve that selectively prevents coolant flow from the radiator to the engine via the junction in response to the temperature of the phase changing material.

14. The system of claim 13, further comprising retarding engine spark timing in response to the temperature of the phase changing material.

15. A method for operating a cooling system, comprising:
opening a heater core bypass valve and transferring heat from exhaust gases to a phase changing material included in an exhaust gas heat recovery device that includes an exhaust gas to liquid coolant heat exchanger and an exhaust heat recovery device valve in response to a temperature of the phase changing material, where the liquid coolant heat exchanger is in fluidic communication with an engine; and
transferring heat stored in the phase changing material to a housing or sleeve in which the exhaust heat recovery device valve of the exhaust gas heat recovery device is positioned after stopping operation of the engine.

16. The method of claim 15, further comprising closing a valve to prevent coolant flow from a radiator to the engine in response to the temperature of the phase changing material.

17. The method of claim 16, further comprising retarding spark timing of the engine in response to the temperature of the phase changing material.

18. The method of claim 17, further comprising holding an exhaust gas recirculation valve closed in response to the temperature of the phase changing material.

19. The method of claim 18, further comprising opening the valve to allow coolant flow from the radiator to the engine in response to the temperature of the phase changing material exceeding a threshold temperature.

20. The method of claim 15, further comprising opening the exhaust heat recovery device valve in response to a temperature of the engine exceeding a threshold temperature.

* * * * *